United States Patent [19]

Takano et al.

[11] Patent Number: 4,632,579
[45] Date of Patent: Dec. 30, 1986

[54] PRINTING SYSTEM IN DOT PRINTER

[75] Inventors: Hirokuni Takano; Tadao Shimizu; Osamu Izaki, all of Tokyo, Japan

[73] Assignee: Oki Electric Industry Co., Ltd., Tokyo, Japan

[21] Appl. No.: 815,280

[22] Filed: Dec. 26, 1985

Related U.S. Application Data

[63] Continuation of Ser. No. 633,986, Jul. 25, 1984, abandoned.

[30] Foreign Application Priority Data

Jul. 26, 1983 [JP] Japan ................................ 58-135228
Sep. 21, 1983 [JP] Japan ................................ 58-173163

[51] Int. Cl.$^4$ ................................................. B41J 3/12
[52] U.S. Cl. .................................. 400/121; 101/93.04; 340/728
[58] Field of Search .............................. 400/121, 124; 101/93.04, 93.05; 178/15, 30; 340/728, 731, 735

[56] References Cited

U.S. PATENT DOCUMENTS 4,242,003 12/1980 Ragen ................................ 400/124

OTHER PUBLICATIONS

*IBM Tech. Disc. Bulletin*, by H. E. Berkebile et al., vol. 25, No. 10, Mar. 1983, "Draft-to-Text Font Conversion Algorithm".

*Primary Examiner*—Paul T. Sewell
*Attorney, Agent, or Firm*—Peter L. Berger

[57] ABSTRACT

The present invention relates to a dot printer for printing letters or symbols by aggregated dots, which is characterized in that the second dot matrix pattern is generated from a basic dot matrix pattern by a simple algorithm so that gaps between dots in the basic dot matrix pattern are filled up, the basic dot matrix pattern and the second dot matrix pattern are synthetically edited, and high-grade printed letters are obtained by using the resulting edited dot matrix pattern.

3 Claims, 42 Drawing Figures

Fig 1
PRIOR ART (I)  (II)  (III)

Fig 2
PRIOR ART (I)  (II)  (III)

(III)

(IV)

PRINTING SYSTEM IN DOT PRINTER

This application is a continuation of application Ser. No. 633,986, filed July 25, 1984, abandoned.

BACKGROUND OF THE INVENTION (1) Field of the Invention

The present invention relates to a printing system for performing high-grade printing in a dot printer in which letters or symbols are printed by aggregated dots.

(2) Description of the Prior Art

The conventional high-grade printing system in the dot printer will now be described with reference to the accompanying drawings.

Figure 1:
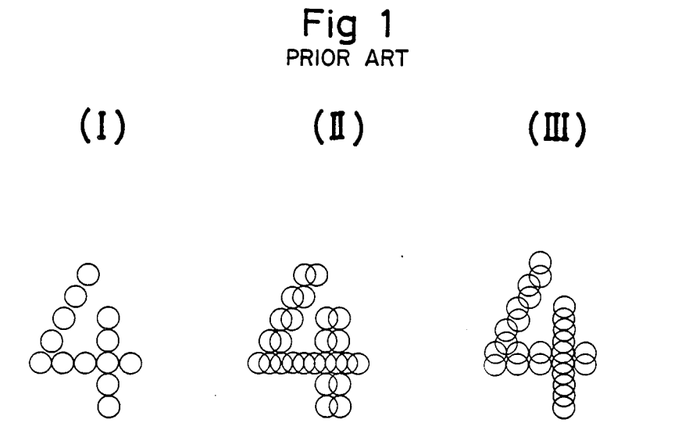
Figure 2:
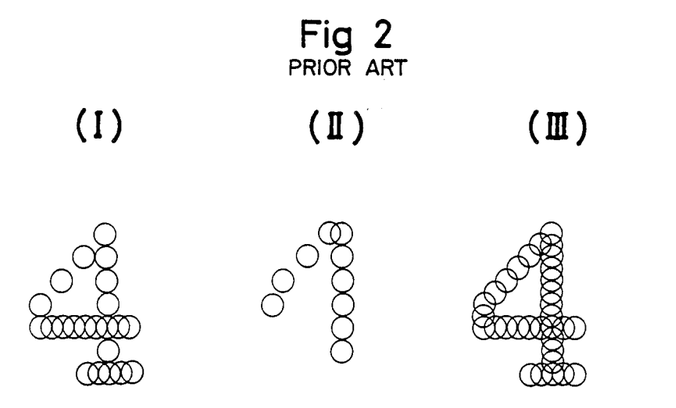

FIG. 1-(I) shows a basic dot pattern, and FIGS. 1-(II) and 1-(III) show a high-grade printing pattern. FIGS. 2-(I) and 2-(II) show two different printing patterns, and FIG. 2-(III) shows the high-grade printing pattern. In the drawings, numeral 4 is used as an example of the pattern.

In the first conventional system, shown in FIG. 1-(I), the number of wires of a printing head is increased and dots are arranged in zigzags to form a high-density dot arrangement. This system is defective in that though high-grade printing can be attained, the structure and control of the apparatus are complicated and the apparatus is expensive.

In the second system, the basic pattern shown in FIG. 1-(I) is slightly shifted in the horizontal direction as shown in FIG. 1-(II) and printing is carried out again. A system in which the basic pattern is slightly shifted in the vertical direction and printing is carried out again is shown in FIG. 1-(III). According to the printing system of the FIG. 1-(II) and FIG. 1-(III) type, the operation is simple and apparatus is not expensive. However, the system is defective in that the quality of printed letters is poor.

As a third system, two different patterns, such as those shown in FIGS. 2-(I) and 2-(II), are slightly shifted in the vertical direction to obtain high-grade printing as shown in FIG. 2-(III). This system is defective in that since two different letter patterns are necessary, the memory capacity is increased and the apparatus is expensive.

SUMMARY OF THE INVENTION

The present invention relates to a printing system in which a second dot matrix pattern is generated from a basic dot matrix pattern by an algorithm so that gaps between desirable dots of the basic dot matrix pattern are filled up. The basic dot matrix pattern and the second dot matrix pattern are synthesized to obtain printing of the synthesized dot matrix pattern.

A primary object of the present invention is to obtain a high-grade printing pattern.

A secondary object of the present invention is to attain the above-mentioned primary object by a simple apparatus without increasing the number of wires of a printing head.

A third object of the present invention is to obtain high-grade printing more assuredly than in the conventional techniques where printing is carried out two times while slightly shifting one printing pattern.

A fourth object of the present invention is to reduce the memory capacity over the conventional techniques where printing is carried out two times while slightly shifting different printing patterns.

A fifth object of the present invention is to provide a printing system in which basic dot data and auxiliary data for inhibiting insertion of an interpolation dot between unnecessary dots are stored in a letter pattern storage memory, whereby the capacity of the letter pattern storage memory is reduced and a high-grade printing pattern is obtained.

A sixth object of the present invention is to simplify the logical operation for determining dots to be inserted between dots.

BRIEF DESCRIPTION OF THE DRAWINGS

FIG. 1 (I) shows a basic dot pattern according to conventional technique.

FIG. 1-(II) shows a high-grade printing pattern according to another conventional technique.

FIG. 1-(III) shows the high-grade printing pattern according to yet another conventional technique.

FIGS. 2-(I) and 2-(II) show two different printing patterns according to conventional techniques.

FIG. 2-(III) shows a high-grade printing pattern according to another conventional technique.

FIGS. 4-(I) through 4-(VIII) are diagrams showing the algorithmic conversion processing of various basic patterns according to the present invention.

FIG. 9-(I) shows a basic letter pattern used when the repeated driving timing of a printing head is ½ dot.

FIG. 9-(II) shows the high-grade printing pattern by the conversion algorithm according to a first embodiment.

FIG. 10-(I) shows the basic letter pattern used when the repeated driving timing of the printing head is ¼ dot.

FIG. 10-(II) shows the high-grade printing pattern.

FIG. 12-(I) is a diagram showing the contents of basic dot data stored in the letter pattern storage memory.

FIG. 12-(II) is a diagram showing the contents of stored basic dot data and auxiliary data.

FIGS. 13-(I) through 13-(IX) are diagrams illustrating the conversion algorithm according to a second embodiment.

FIGS. 14-(I) through 14-(III) are diagrams illustrating insertion of dots between dots.

FIGS. 15-(I) through 15-(IV) are diagrams illustrating the operation of inserting dots between dots.

DETAILED DESCRIPTION OF THE PREFERRED EMBODIMENTS

The present invention will now be described in detail with reference to embodiments illustrated in the accompanying drawings.

Figure 3:
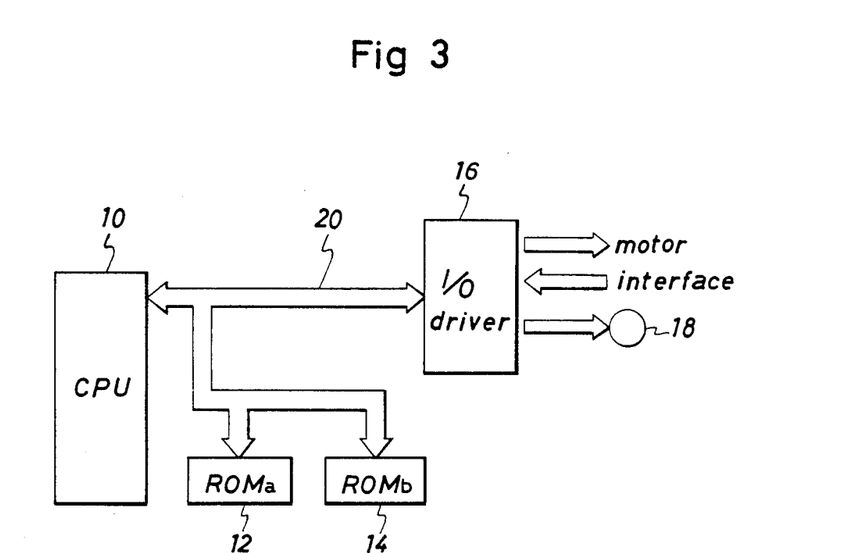
FIG. 3 is a block diagram illustrating the structure of an apparatus according to one embodiment of the present invention.

FIG. 3 is a block diagram illustrating the structure of an apparatus according to one embodiment of the present invention. Reference numeral 10 represents a microprocessor (hereinafter referred to as "CPU") for controlling a printer, and reference numeral 12 represents a read-only memory (hereinafter referred to as "ROMa") for storing a program therein. Reference numeral 14 represents a read-only memory (hereinafter referred to as "ROMb") for storing a dot pattern of letters or symbols therein and reference numeral 16 represents an I/O driver driven by instructions from CPU 10. A printing head 18 is connected to the I/O driver 16. An LF motor (not shown) for effecting line shifting in a printing paper, a spacing SP motor (not shown) for moving the printing head 18 in the printing direction and an interface portion (not shown) for taking in printing data are connected to the I/O driver 16. The respective parts are connected to one another through bus lines 20.

In the printing operation by the apparatus having the above-mentioned circuit structure, CPU 10 receives control data and printing data from the interface according to the program stored in ROMa 12. On receipt of the printing data, a letter dot pattern is read out from ROMb 14 by using the received data as an address. When the control data indicates high-grade printing, the letter dot pattern read out from ROMb 14 is edited according to a conversion algorithm and printing is carried out based on the edited data.

The conversion algorithm for attaining a high-grade printing will now be described with reference to FIG. 4.

Figure 4:
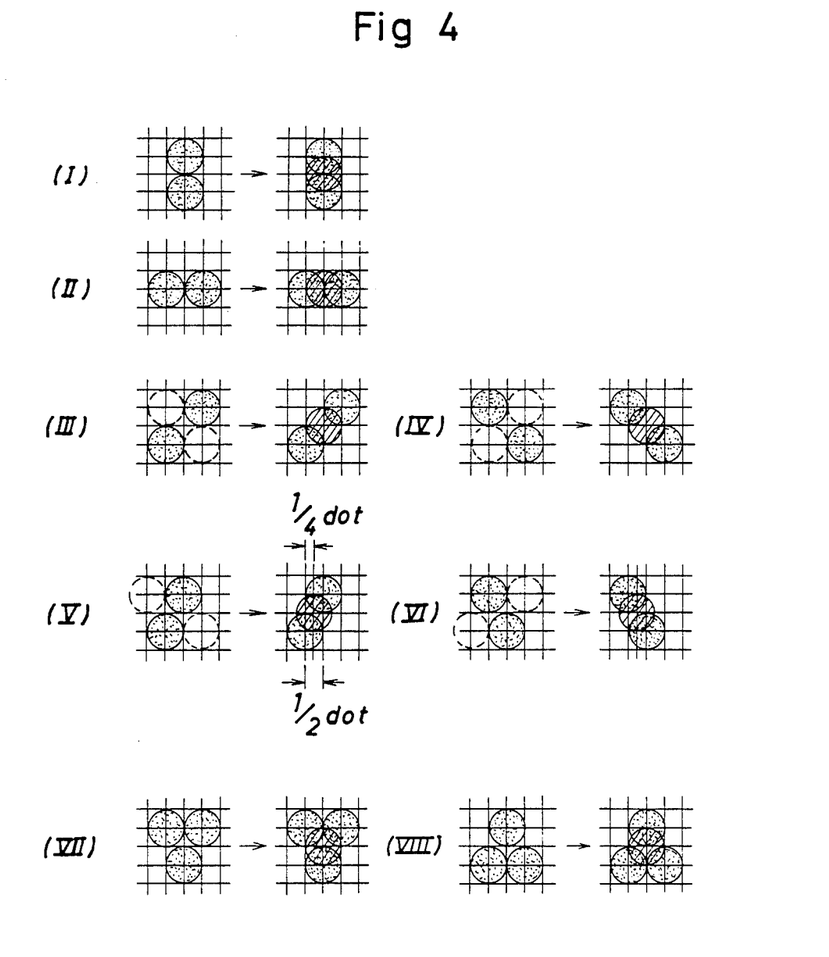

FIGS. 4-(I) through 4-(VIII) show algorithmic conversion of various basic patterns. Dot ● indicates data of the dot read out from ROMb 14, ○ indicates the absence of data read out from ROMb 14 on the corresponding bit, and ◉ indicates data of the dot to be interpolated.

Figure 5:
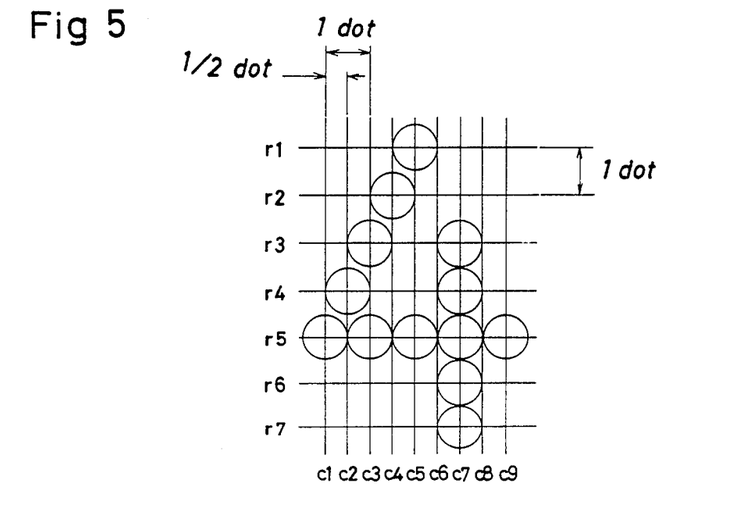
FIG. 5 is a diagram showing an example of the basic dot pattern used in the present invention.
Figure 6:
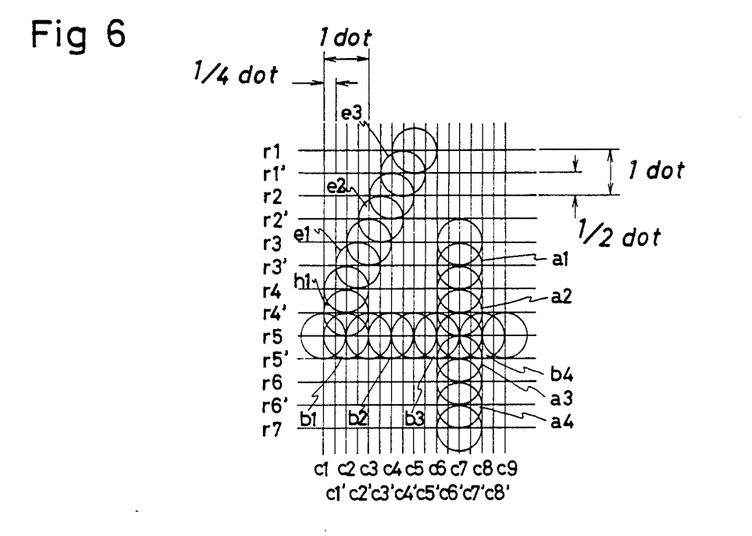
FIG. 6 is a diagram showing an example of the algorithmic conversion processing according to the present invention.

An example of printing of numeral 4 according to this conversion algorithm is illustrated in FIGS. 5 and 6.

FIG. 5 shows a basic pattern which is read out from ROMb 14. Incidentally, the basic pattern is a letter pattern consisting of 7 vertical rows ($r_1$ through $r_7$) and 9 lateral columns ($c_1$ through $c_9$).

FIG. 6 shows a printing pattern formed by printing a second pattern edited according to the conversion algorithm shown in FIG. 4 on the basic pattern shown in FIG. 5. In FIG. 6 $a_1$ through $a_4$ indicate interpolated dots according to the conversion shown in FIG. 4-(I), $b_1$ through $b_4$ indicate interpolated dots according to the conversion shown in FIG. 4-(II), $e_1$ through $e_3$ indicate interpolated dots according to the conversion shown in FIG. 4-(V), and $h_1$ indicates an interpolated dot according to the conversion shown in FIG. 4-(VIII).

Printing of this numeral 4 is performed by the printing head 18 shown in FIG. 3. This printing head 18 comprises seven wires, and at the first spacing (one pass), dots of rows $r_1$ through $r_7$ shown in FIG. 6 are printed. A printing paper is shifted upward by $\frac{1}{2}$ dot or the printing head 18 is shifted downward by $\frac{1}{2}$ dot. At the second spacing, dots $r_1'$ through $r_6'$ shown in FIG. 6 are printed to effect high-grade printing as shown in FIG. 6. Printing for filling up gaps in the basic pattern is performed based on the interpolation data according to the conversion algorithm.

Formation of the interpolation data and the printing operation will now be described with reference to FIGS. 7 and 8.

Figure 7:
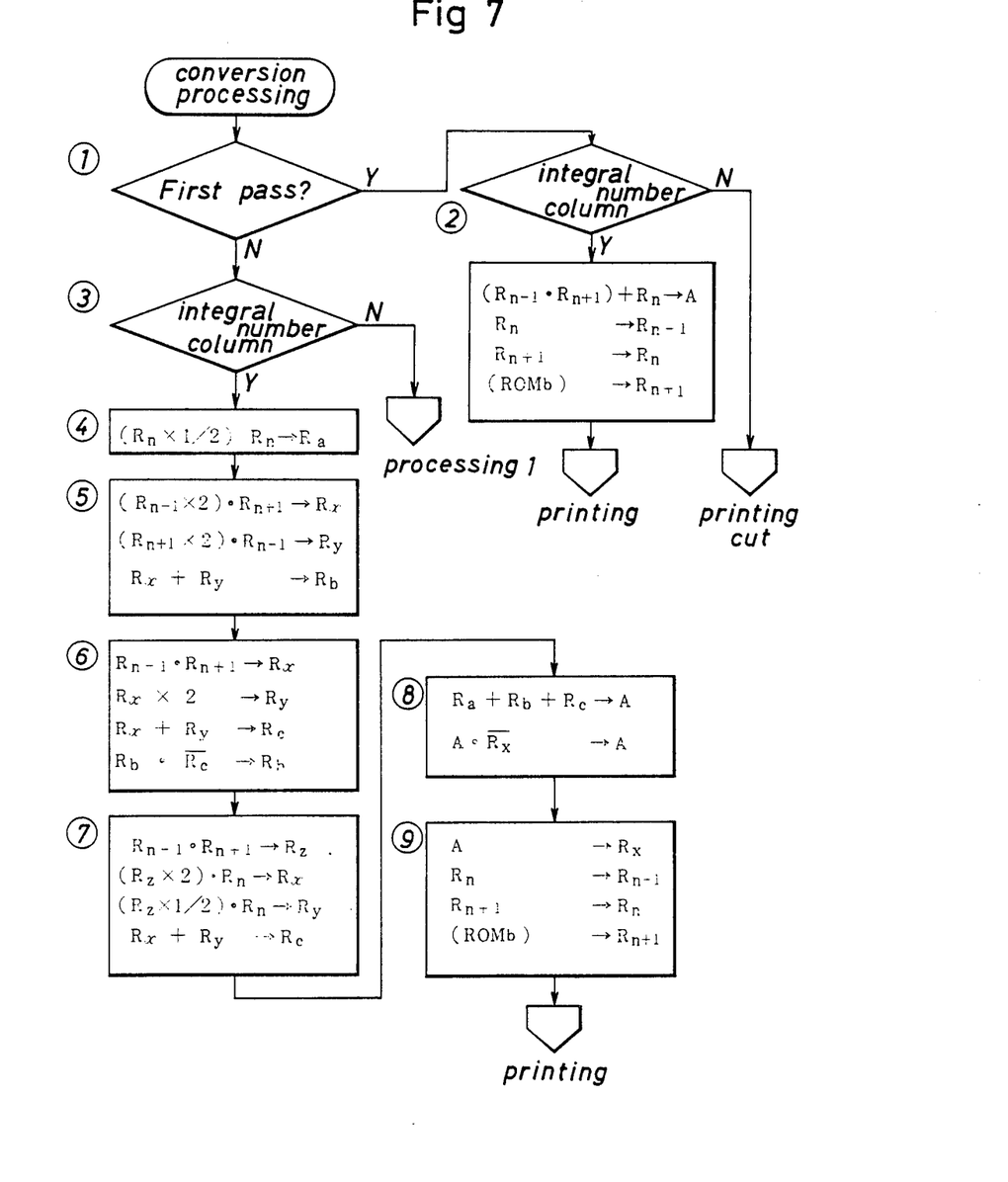
FIG. 7 is a flow chart of the algorithmic conversion processing using integer columns.
Figure 8:
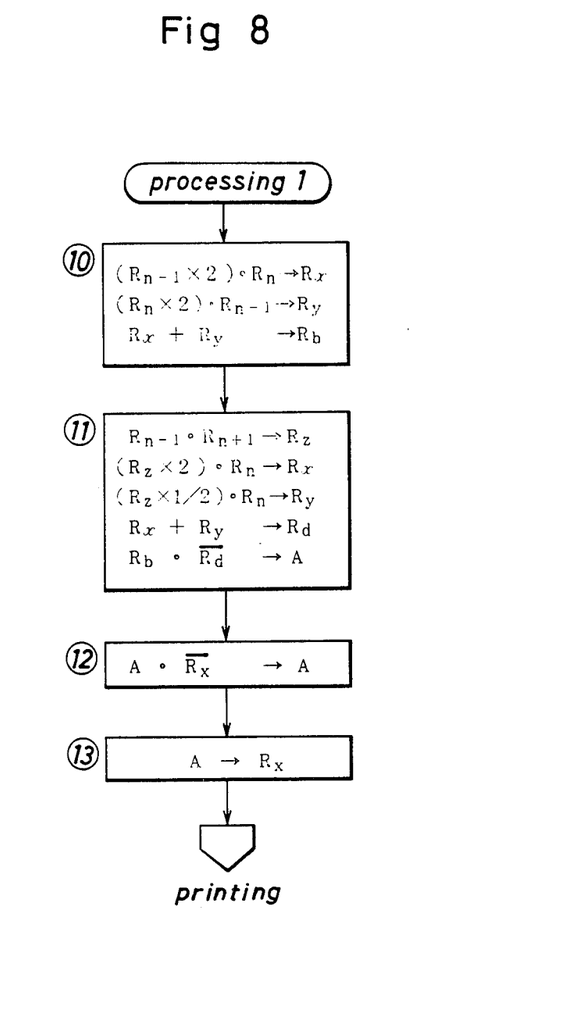
FIG. 8 is a flow chart of the algorithmic conversion processing using columns other than integer columns.
Figure 9:
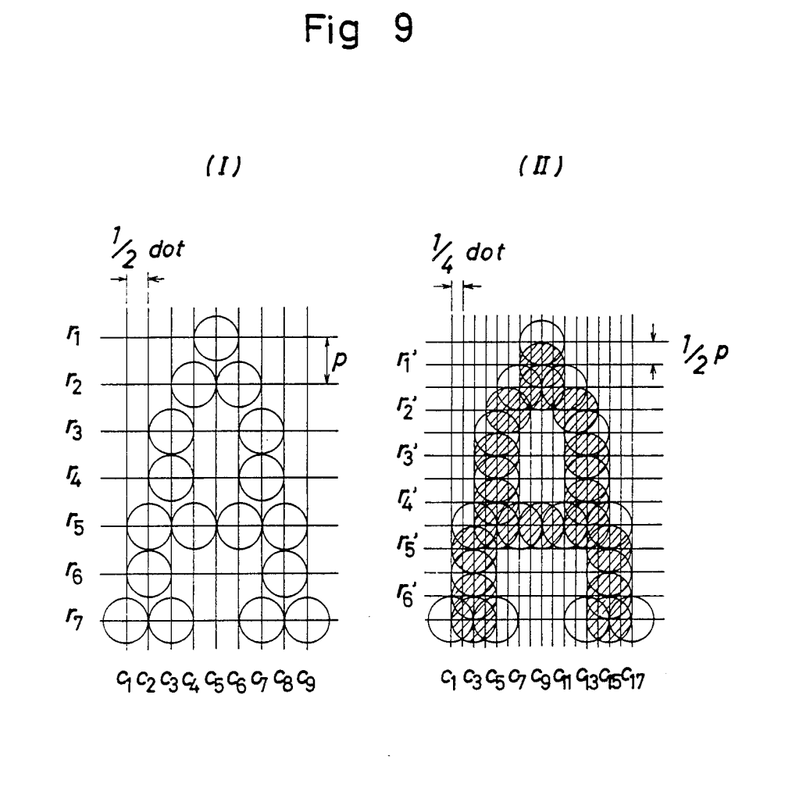

FIG. 7 is a flow chart illustrating the conversion processing using integer columns, and FIG. 8 is a flow chart illustrating the conversion processing using columns other than integer columns.

In the drawings, $c_1$ through $c_9$ shown in FIG. 6 are used as the integer columns. $R_n$, $R_{n-1}$ represent registers for storing printing data of the column to be printed, printing data of the preceding column and printing data of the next column, respectively. For conversion processing using columns other than integer columns (columns $c_1'$ through $c_8'$ shown in FIG. 6), $R_n$, $R_{n-1}$ and $R_{n+1}$ represent registers for storing printing data of the column appearing $\frac{1}{4}$ dot after the column to be printed, printing data of the column appearing $\frac{1}{4}$ dot before the column to be printed and printing data of the column appearing $\frac{3}{4}$ dot after the column to be printed, respectively. Each of $R_a$ through $R_d$ and $R_x$ through $R_z$ represents a general-purpose register, $R_x$ represents a register for storing printing data appearing $\frac{1}{4}$ dot before the column to be printed, and A represents an accumulator. In each logical operation, "·" indicates a logical product, "+" indicates a logical sum, "×2" represents 1-bit shift-up, "−" indicates a complement, and "×$\frac{1}{2}$" indicates 1-bit shift-down. Reference numerals ① through ⑬ are step numbers.

FIGS. 3, 4, 5 and 6 will be referred to according to need in the following explanation of the printing operation.

In the printing operation, the SP motor in FIG. 3 is driven to move the printing head 18 to a predetermined position, and a letter code to be printed is given to CPU 10 from the interface through the I/O driver.

CPU 10 reads out the printing data of the column to be printed and the next column from ROMb 14 and these data are stored in the registers $R_n$ and $R_{n+1}$. At this point, 0 is stored in the register $R_{n-1}$.

After this storing step, the conversion processing shown in FIG. 7 is started. At first, it is judged at the step ① whether or not it is the first pass. If it is judged that the pass is the first pass, the step ② is carried out and the interpolation shown in FIG. 4-(II) is carried out.

At this step ②, ROMb 14 reads out the subsequent printing data and stores it in the register $R_{n+1}$.

In this state, printing is started by giving the data of the accumulator A to the printing head 18. When printing of one integer column is completed, the printing operation is transferred to the subsequent integer column, and in this manner, the steps ① and ② are repeated to complete printing of one letter. This corresponds to printing on the rows $r_1$ through $r_7$ shown in FIG. 6. On completion of printing of one letter, CPU 10 receives the next letter code and the above steps are repeated. Thus, printing of one line is carried out. This corresponds to the state where printing on the rows $r_1$ through $r_7$ is conducted over one line.

After printing on the rows $r_1$ through $r_7$ over one line has been conducted in the above-mentioned manner, the printing paper is shifted upward by $\frac{1}{2}$ dot or the printing head 18 is shifted downward by $\frac{1}{2}$ dot, and the printing head 18 is returned to the position of the first letter to be printed on the new line and printing of the second pass is started.

At first, in the same manner as described above, the printing data are stored in the registers $R_n$, $R_{n-1}$ and $R_{n+1}$.

Since the pass is the second pass, the flow enters into the step ③ from the step ①. At the step ③, it is judged whether or not the column is an integer column, and when it is judged that the column is an integer column, the flow enters into the step ④.

At the step ④, the process of forming the interpolation data shown in FIG. 4-(I) is carried out, and at the step ⑤, the process of forming the interpolation data shown in FIGS. 4-(III) and 4-(IV) is carried out. Only when there is no data on the bit⊂⊃in FIGS. 4-(III) and 4-(IV), at the step ⑥, is the interpolation data obtained at the step ⑤ effectively processed. At the step ⑦, the process for effecting the interpolation shown in FIGS. 4-(VII) and 4-(VIII) is performed (the process for interpolating a dot at the median when three dots form a triangle). At the step ⑧, the editing process is carried out so that printing is not effected on the row where printing has been effected before ¼ dot. The process for preparing for printing of the next column is carried out at the step ⑨.

The foregoing processing is one using integer columns, as shown in FIG. 7. The conversion processing of columns other than the integer columns, as shown in FIG. 8, is further carried out.

At the step ⑩ shown in FIG. 8, the processing for forming the interpolation data shown in FIGS. 4-(V) and 4-(VI) is carried out. In step ⑪ only when there is no data corresponding to the bit⊂⊃in FIGS. 4-(V) and 4-(VI), is the processing for rendering the interpolation data obtained at the step ⑩ effective carried out. The same editing processing as conducted at the step ⑧ shown in FIG. 7 is carried out at the step ⑫ in FIG. 8, and the preparatory processing as conducted at the step ⑨ shown in FIG. 7 is carried out at the step ⑬ in FIG. 8.

This printing of the second pass is accomplished by giving the data obtained by the editing processing conducted at the step ⑧ and the data of the accumulator A obtained at the step ⑫ to the printing head 18.

When printing of one column is completed, printing of the next column is started and step ③ and subsequent steps are repeated, until printing of one letter is completed. This operation corresponds to printing on the rows $r_1'$ through $r_6'$ shown in FIG. 6. When printing of one letter is thus completed, CPU 10 receives the letter code of the subsequent letter and the above-mentioned steps are repeated. In this manner, printing of one line is completed. This corresponds to the state where printing is effected over 1 line with respect to the rows $r_1'$ through $r_6'$ shown in FIG. 6. Printing of letters of this line according to the algorithmic conversion processing, that is, high-grade printing, is thus completed.

Then, one-line shifting is performed and the printing head 18 is returned to the printing-starting position, and printing on the next line is started.

In the foregoing embodiment, the conversion processing is carried out at a low printing speed of the printer. In the case where the printing speed of the printer is high, a buffer memory is connected to the bus line 20 shown in FIG. 3, and the editing processing is carried out before the printing operation to store printing data in the buffer memory. At the time of printing, the printing data is read out from the buffer memory and printing is then performed. If this arrangement is adopted, the above-mentioned effects can similarly be attained even if the printing speed is high.

In the conversion processing of this case, the results of editing at the step ② shown in FIG. 7 and the results of editing at the steps ⑧ and ⑫ shown in FIGS. 7 and 8 are separately stored in the buffer memory. Other procedures are the same as in the above-mentioned embodiment and the printing data of the first pass and the printing data of the second pass are read out from the separated areas of the buffer memory, respectively.

The foregoing embodiment has been described with reference to the dot matrix pattern having 7 rows and 9 columns, but the dot matrix pattern is not limited to this dot matrix pattern. Namely, the present invention can be carried out on any basic dot matrix pattern respectively of the dot matrix structure and a dot matrix pattern of high-grade printing can be obtained with a reduced memory capacity.

For example, the number of letters used for an ordinary printer is about 256 inclusive or alphabetic letters, numerical letters, symbols and kana letters. In the conventional system shown in FIG. 2, two dot patterns are necessary for every letter for high-grade printing. Accordingly, in case of a 9-column structure, a memory of 4608 bytes ($=256\times2\times9$) is necessary. In contrast, in the above embodiment of the present invention, a conversion program of about 200 bytes is sufficient.

The present invention will now be described with reference to a second embodiment where the printing density is doubled in the column direction, that is, printing is carried out at ½ dot intervals to further increase the printing grade. In this second embodiment, interpolation in the column direction need not be computed.

Figure 12:
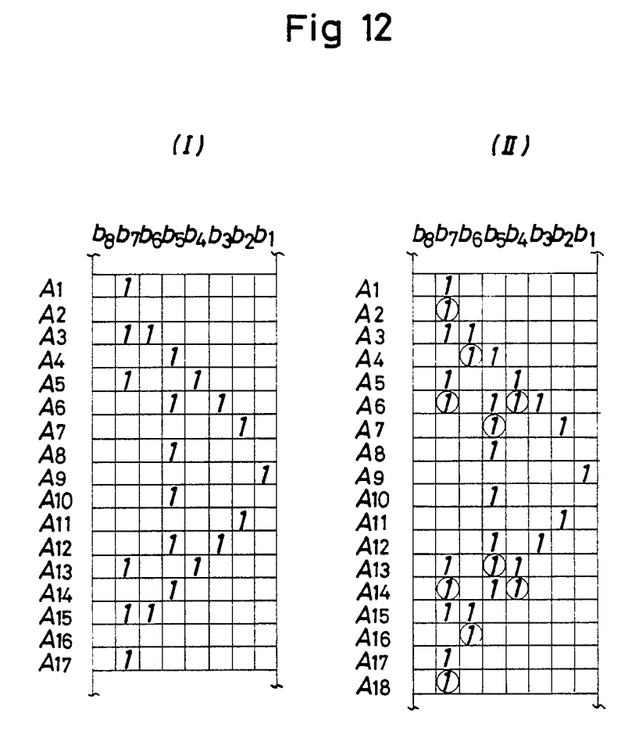

The data of the basic pattern and the auxiliary data of dots to be interpolated are stored in the ROMb 14 shown in FIG. 3, as shown in FIG. 12-(II) (pattern A is illustrated as an example). For comparison, the case where only the data of the basic pattern is stored is shown in FIG. 12-(I). FIG. 12 shows the memory space. $A_1, A_2, \ldots A_{17}$ represent addresses and $b_1, b_2, \ldots b_8$ represent bits of each address. For convenience's sake, $A_1, A_2, \ldots A_{17}$ are made to correspond to columns $c_1, c_2, \ldots c_{17}$ shown in FIG. 10-(I) and the bits $b_1, b_2, \ldots b_7$ are made to correspond to rows $r_1, r_2, \ldots r_7$. The memory space has an 8-bit width, though the width of the memory space is not limited to this width.

Figure 10:
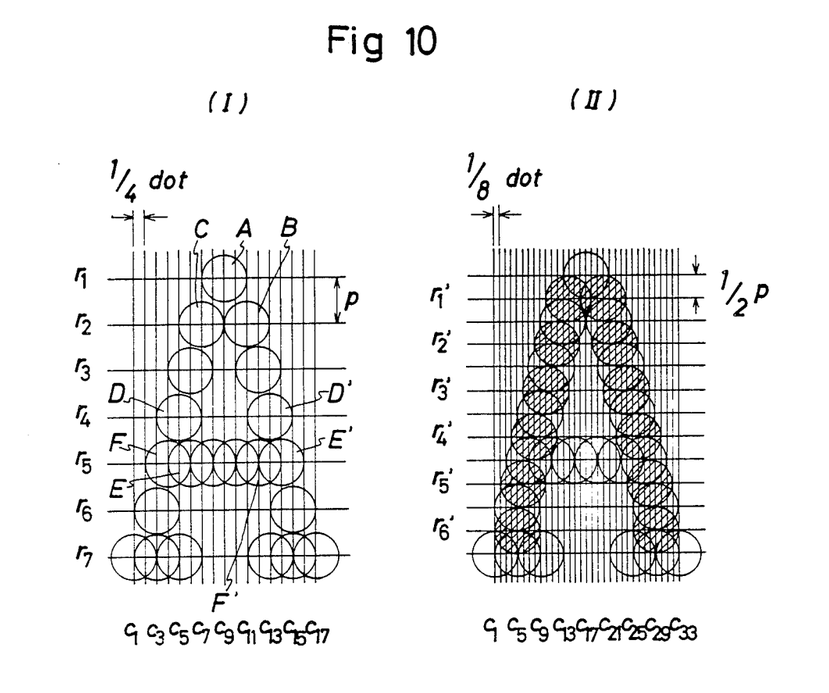
Figure 11:
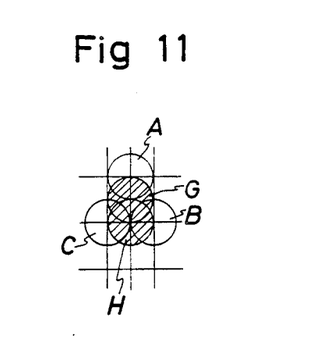
FIG. 11 is a diagram illustrating the defect of the conversion algorithm of the first embodiment.

In FIG. 12, "1" in the grid is data for the basic pattern, which corresponds to the encircled data in FIG. 10-(I). A blank grid corresponds to other data not printed, and "①" indicates auxiliary data of the dot to be interpolated.

Figure 13:
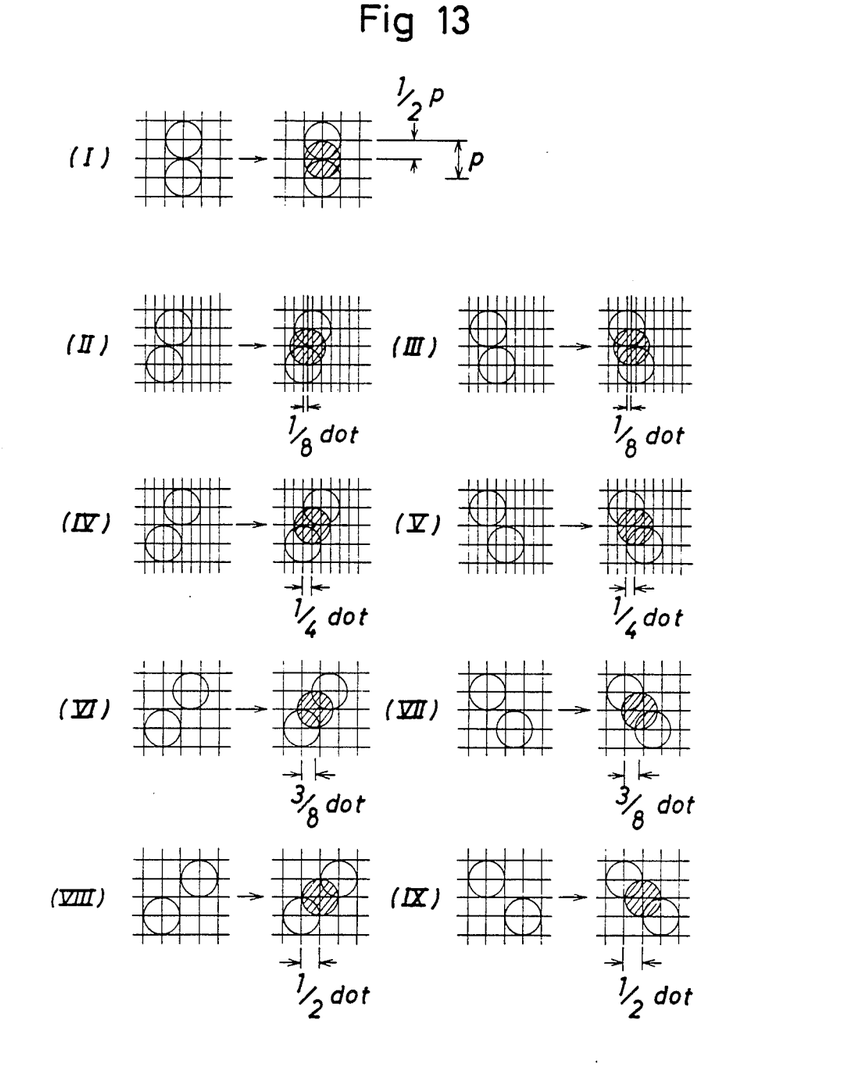

FIG. 13 diagrammatically shows the conversion algorithm of the FIG. 12 embodiment.

Figure 14:
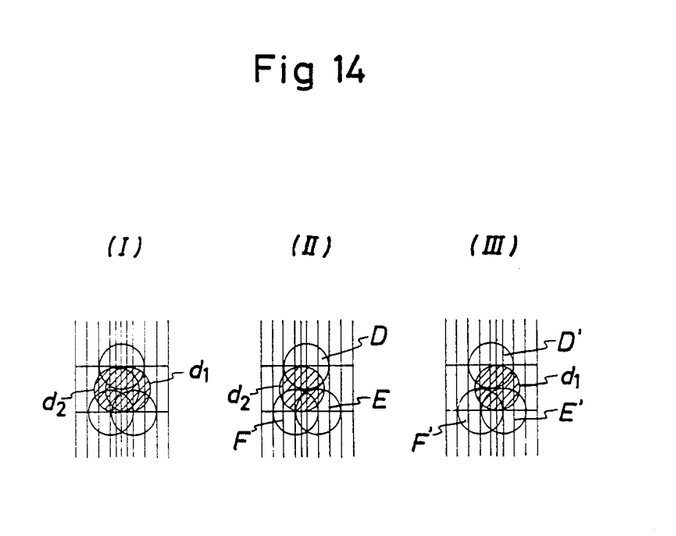

The manner of using the auxiliary data of dots to be interpolated will now be described. For example, with reference to dots D, E, F, D', E' and F' shown in FIG. 10-(I), according to the conversion algorithms of FIGS. 13-(II) and 13-(III), dots $d_1$ and $d_2$ are interpolated as shown in FIG. 14-(I). Needless to say, interpolation of dot $d_2$ shown in FIG. 14-(II) is most preferred for dots D, E and F shown in FIG. 10-(I). Interpolation of dot $d_1$ shown in FIG. 14-(III) is most preferred for dots D', E' and F'.

Accordingly, in the present embodiment, the following point is noted and utilized. As shown in FIG. 10-(I), one letter is horizontally divided into segments of ¼ dot. The interval between two continuous dots in the horizontal direction is ½ dot and there is no continuity of the interval of ¼ dot. The reason is that since the interval of ½ dot is sufficient for the printing grade in the horizontal direction and the printing speed of the printer is limited by the repeated driving speed of the printing head, the dot interval in the horizontal direction cannot be so narrowed for increasing the printing speed.

If this point is utilized, the auxiliary data ① for determining whether or not the interpolation dot should be added can be added relatively to the printing data as shown in FIG. 12-(II). Addition of the auxiliary data ① may be accomplished by adding data "1" of the subsequent dot positions of the same row to the positions of two basic dots where interpolation is not desired.

For example, referring to FIG. 14-(II) where interpolation is not desired in dots D and E, auxiliary data ① is added to the position of $(A_6, b_4)$ subsequent to the position of address $A_5$ and $bit_4$ corresponding to dot D [hereinafter referred to as "$(A_5, b_4)$"; similar abbreviations will be used hereinafter] and the position of $(A_7, b_5)$ subsequent to the position of $(A_6, b_5)$ corresponding to dot E. Similarly, in FIG. 14-(III), auxiliary data ① is added to the position of $(A_{14}, b_4)$ and the position of $(A_{13}, b_5)$. In this case, the reading direction is $A_1 \rightarrow A_{17}$.

When the letter pattern data stored as shown in FIG. 12-(II) is read out, the first read data "1" in the same row is used as the printing data. When data "1" continuously appears on the next address, this data "1" is not used as the printing data but as the auxiliary data. When data "1" continuously appears on the next address again, this data is used as the printing data. This is repeated as follows.

When pattern "A" shown in FIG. 10-(II) is printed by using the letter pattern data shown in FIG. 12-(II), the driving timing of the printing head is set at ½ dot, but the interval between two continuous dots in the lateral direction is ½ dot and printing is effected on the rows $r_1, r_2 \ldots r_7$ of the columns $C_1, C_3, C_5 \ldots C_{33}$.

The following method is adopted for forming the printing data for the above printing operation. The data of address $A_1$ [hereinafter referred to as "$(A_1)$"; similar abbreviations will be used with reference to $A_2, A_3, \ldots$ ] is directly used in the column $C_1$. With respect to the column $C_3$ (stored at address $A_2$), logical product $(A_1) \cdot (A_2)$ of the preceding printing data $(A_1)$ and the present printing data $(A_2)$ is computed. By inversion $\overline{(A_1) \cdot (A_2)}$ of this logical operation, the position of the auxiliary data-stored bit (the data at this position is logic "0") is known. Furthermore, the logic product $\overline{(A_1) \cdot (A_2)} \cdot (A_2)$ of the obtained result and the present printing data $(A_2)$ is computed to obtain the data to be practically printed. With respect to the column $C_5$ (stored at address $A_3$), the data to be practically printed, that is, $[\overline{(A_1) \cdot (A_2)} \cdot (A_2)] \cdot (A_3) \cdot (A_3)$, is similarly determined from the preceding printing data $[(A_1) \cdot (A_2) \cdot (A_2)]$ and the present printing data $(A_3)$. With respect to the columns $C_7, C_9, \ldots C_{33}$, data to be practically printed will similarly be obtained.

With respect to each of the columns $C_2, C_4, C_6, C_8, \ldots C_{32}$, since printing is not performed, the printing data is logic "0".

The pattern to be printed in this case is as shown in FIG. 10-(I) and the interval between two continuous dots is ½ dot or more, as pointed our hereinbefore.

When printing is conducted on the rows $r_1', r_2', \ldots r_6'$ of the columns $C_1, C_2, C_3, \ldots C_{33}$, the printing paper is shifted upward by ½ pitch (½P) and interpolation dots are printed while setting the driving timing of the printing head at ½ dot.

Figure 15:
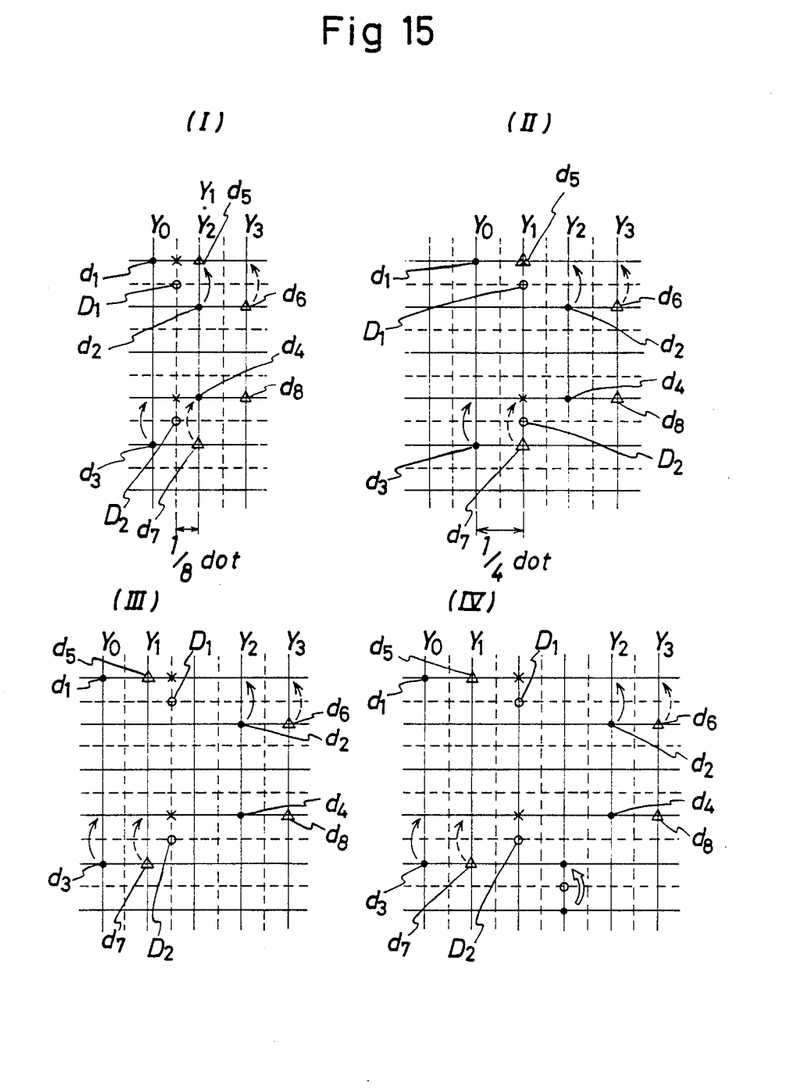

The following method is adopted for forming the interpolation data for the above printing operation. Referring to FIG. 15, vertical solid lines represent odd number columns $C_1, C_3, \ldots C_{33}$, vertical dotted lines represent even number columns $C_2, C_4, \ldots C_{32}$, horizontal solid lines represent rows $r_1, r_2, \ldots r_7$, and horizontal dotted lines represent rows $r_1', r_2' \ldots r_6'$. Incidentally, "●" corresponds to data "1" shown in FIG. 12-(II), "△" corresponds to auxiliary data ① shown in FIG. 12-(II) and "▿" represents an interpolation dot. The column where the leftmost "●" in FIG. 15 is carried, that is, the column where printing has been completed, is designated as $Y_0$, and the printing data of the column $Y_0$ is designated as $R_0$. The column where the rightmost "●" is carried, that is, the column where printing is going to start, is designated as $Y_2$ and the printing data of the column $Y_2$ is designated as $R_2$. The column where the auxiliary data (leftmost "△") corresponding to the printing data of the column $Y_0$ is carried is designated as $Y_1$, and the printing data of the column $Y_1$ is designated as $R_1$. The column where the auxiliary data (rightmost "△") corresponding to the printing data of the column $Y_2$ is carried is designated as $Y_3$, and the printing data of the column $Y_3$ is designated as $R_3$.

As is apparent from the drawings, the columns $Y_1, Y_2$ and $Y_3$ are located at the odd number column positions shown in FIG. 10-(II). The printing data and auxiliary data are stored in the letter pattern-storing memory as shown in FIG. 12-(II).

Formation of the interpolation dot data is accomplished according to the following procedures.

(i) Simulation data (upper mark "x") of dot $D_1$ to be interpolated between dots $d_1$ and $d_2$ is determined.

(ii) Simulation data (lower mark "X") of dot $D_2$ to be interpolated between dots $d_3$ and $d_4$ is determined.

(iii) The data for inhibiting the interpolation by the interpolation dot $D_1$ is determined.

(iv) The data for inhibiting the interpolation by the interpolation dot $D_2$ is determined.

(v) The interpolation shown in FIG. 13-(I) is effected only with respect to the odd number columns $C_1, C_3, \ldots C_{33}$.

In the method (i), the following logical operation is carried out:

$$R_0 \cdot R_2' \tag{1}$$

In the formula (1), $R_2'$ is a value obtained by shifting $R_2$ by 1 bit in the direction of a solid line arrow and mark "●" indicates a logical product.

If there is present the interpolation dot $D_1$ (there are present dots $d_1$ and $d_2$), the value of the formula (1) becomes "1" at the bit position of the corresponding upper mark "x".

When the data of the formula (1) is practically printed on the printing paper, since the paper is shifted upward by ½ pitch, the interpolation dot D1 shown in FIG. 15 is printed.

In the method (ii), the following logical operation is carried out:

$$R_0' \cdot R_2 \tag{2}$$

In the formula (2), $R_0'$ is a value obtained by shifting $R_0$ by 1 bit in the direction of a solid line arrow.

If there is present the interpolation dot $D_2$ (there are present dots $d_3$ and $d_4$), the value of the formula (2) becomes "1" at the bit position of the corresponding lower mark "x".

In the method (iii), the following logical operation is carried out:

$$(R_0 \cdot R_1) \cdot (R_2 \cdot R_3)' \tag{3}$$

In the formula (3), $(R_0 \cdot R_1)$ and $(R_2 \cdot R_3)$ are formulas for determining the auxiliary data, and data "1" is auxiliary data (the printing data is not continuous between the columns $Y_0$ and $Y_1$ or between the columns $Y_2$ and $Y_3$). Furthermore, $(R_2 \cdot R_3)'$ is a value obtained by shifting the result $(R_2 \cdot R_3)$ of the logical operation by 1 bit in the direction of a dotted line arrow.

If there is present the data for inhibiting the interpolation by the interpolation dot $D_1$ (there are present the auxiliary data $d_5$ and $d_6$), the value of the formula (3) becomes "1" at the corresponding bit position.

In the method (iv), the following logical operation is carried out:

$$(R_0 \cdot R_1)' \cdot (R_2 \cdot R_3) \tag{4}$$

In the formula (4), $(R_0 \cdot R_1)'$ is a value obtained by shifting the resulting $(R_0 \cdot R_1)$ by 1 bit in the direction of a dotted line arrow.

If there is present the data for inhibiting the interpolation by the interpolation dot $D_2$ (there are present the auxiliary data $d_7$ and $d_8$), the value of the formula (4) becomes "1" at the corresponding bit position.

In the method (v), the following logical operation is carried out while the basic dot data printed at the preceding step (the data of the odd number column) is designated as $R_5$ and the data to be presently printed is designated as $R_6$:

$$(R_6 \cdot \overline{R_5 \cdot R_6}) \cdot (R_6 \cdot \overline{R_5 \cdot R_6})' \tag{5}$$

In the formula (5), $(R_6 \cdot \overline{R_5 \cdot R_6})$ indicates the logical operation of eliminating the auxiliary data from the present printing data. The operator "−" indicates the inversion and the mark " ′ " represents the 1-bit shifting in the direction of arrow .

When the data of the even number column is printed, the data of the interpolation dot to be practically printed is determined from the simulation data obtained in the methods (i) and (ii) and the interpolation-inhibiting data obtained in the methods (iii) and (iv) according to the following logical operation:

$$\underbrace{(R_0 \cdot R_2' + R_0' \cdot R_2)}_{(1)\quad(2)} \cdot \overline{(R_0 \cdot R_1) \cdot (R_2 \cdot R_3)' + (R_0 \cdot R_1)' \cdot (R_2 \cdot R_3)} \tag{6}$$

In the above logical formula, "+" represents the logical sum.

When the data of the odd number column is printed, the data to be printed is determined from the above formulas (5) and (6) as follows:

$$[\text{data of formula (6)}] = (R_6 \cdot \overline{R_5 \cdot R_6}) \cdot (R_6 \cdot \overline{R_5 \cdot R_6})' \tag{7}$$

The dot to be printed at this time is dot ⊛ in FIG. 10-(II), and the interval between two continuous dots in the horizontal direction is ½ dot or more.

As is apparent from the foregoing description, according to the present invention, a second matrix pattern is generated from a basic dot matrix pattern by algorithmic conversion processing. Both the dot matrix patterns are synthesized and edited so that gaps of the basic dot matrix pattern are filled up, whereby the following effects are attained.

In the first place, high-grade printing can be accomplished more assuredly than in the conventional system where printing is conducted two times while slightly shfting one pattern.

In the second place, the memory capacity can be reduced, as compared with the conventional system where printing is carried out while slightly shifting different patterns.

In the third place, the system of the present invention is advantageous over the conventional system where the wire number is increased, because the structure of the apparatus can be simplified and the cost of the apparatus can be reduced.

In the fourth place, by storing the basic dot data and the auxiliary data for inhibition of insertion of the interpolation dot in the letter pattern-storing memory, the capacity of the letter pattern-storing memory for high-grade printing can be reduced. The logical operation for determining the interpolation dot is simplified and the printing grade is further enhanced.

What is claimed is:

1. A method for printing characters by aggregated dots with a dot printer, comprising the steps of:
   generating a basic dot matrix pattern with dots in rows and integer columns;
   generating a second dot matrix pattern from the basic dot matrix pattern with all dots of the second dot matrix pattern being between and in overlapping relation to said dots in said integer columns of the basic matrix pattern;
   said step of generating a second dot matrix pattern including the steps of:
      generating a dot of said second dot matrix pattern between each adjacent two dots of said basic dot matrix pattern which are positioned in the same integer column, only when said generated dot is positioned between and overlaps said two dots in the same integer column;
      generating a dot of said second dot matrix pattern between each two dots of said basic dot matrix pattern which are positioned in adjacent integer columns and in adjacent rows;
      generating a dot of said second dot matrix pattern between each three dots of said basic dot matrix pattern which are positioned in three consecutive integer columns and two adjacent rows in a substantially isosceles triangular configuration, such that the generated dot is positioned between and overlaps said three dots;
   synthesizing and editing dots of said basic dot matrix pattern and said second dot matrix pattern to form a synthesized dot matrix pattern; and
   printing dots of said synthesized dot matrix pattern on a printing medium with at least two printing passes.

2. A method for printing characters by aggregated dots with a dot printer, comprising the steps of:
   generating a basic dot matrix pattern with dots in rows and integer columns;
   generating a second dot matrix pattern from the basic dot matrix pattern with all dots of the second dot matrix pattern being between and in overlapping relation to said dots in said integer columns of the basic matrix pattern;
   said step of generating a second dot matrix pattern including the steps of:
      generating a dot of said second dot matrix pattern between each adjacent two dots of said basic dot matrix pattern which are positioned in the same row, only when said generated dot is positioned between and overlaps said two dots in the same row;

generating a dot of said second dot matrix pattern between each adjacent two dots of said basic dot matrix pattern which are positioned in the same integer column, only when said generated dot is positioned between and overlaps said two dots in the same integer column;

generating a dot of said second dot matrix pattern between each two dots of said basic dot matrix pattern which are positioned in adjacent integer columns and in adjacent rows;

generating a dot of said second dot matrix pattern between each three dots of said basic dot matrix pattern which are positioned in three consecutive integer columns and two adjacent rows in a substantially isosceles triangular configuration, such that the generated dot is positioned between and overlaps said three dots;

synthesizing and editing dots of said basic dot matrix pattern and said second dot matrix pattern to form a synthesized dot matrix pattern; and printing dots of said synthesized dot matrix pattern on a printing medium with at least two printing passes.

3. A method for printing characters by aggregated dots with a dot printer, comprising the steps of:

(a) generating a basic dot matrix pattern with dots in rows and integer columns;

(b) generating an auxiliary dot matrix pattern as part of said basic dot matrix pattern corresponding to row and integer column positions where addition of certain interpolated dots are to be inhibited;

(c) generating a second dot matrix pattern from the basic dot matrix pattern with all dots of the second dot matrix pattern being between and in overlapping relation to said dots in said integer columns of the basic matrix pattern and corresponding to said interpolated dots;

(d) synthesizing and editing dots of said basic dot matrix pattern and said second dot matrix pattern to form a synthesized dot matrix pattern;

(e) printing dots of said synthesized dot matrix pattern on a printing medium with at least two printing passes by a printing device; and (f) inhibiting the supply of dots of said second dot matrix pattern in correspondence with said auxiliary dot matrix pattern, when two dots of said second dot matrix pattern are generated in association with dots of said basic dot matrix pattern which are in consecutive rows and consecutive integer columns.

* * * * *